US010189342B2

(12) United States Patent
Bewley et al.

(10) Patent No.: US 10,189,342 B2
(45) Date of Patent: Jan. 29, 2019

(54) BALL-BALANCING ROBOT AND DRIVE ASSEMBLY THEREFOR

(71) Applicant: THE REGENTS OF THE UNIVERSITY OF CALIFORNIA, Oakland, CA (US)

(72) Inventors: Thomas R. Bewley, La Jolla, CA (US); Jeffrey M. Friesen, La Jolla, CA (US); Eric Sihite, San Diego, CA (US); Daniel Yang, San Dimas, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/549,520

(22) PCT Filed: Feb. 9, 2016

(86) PCT No.: PCT/US2016/017175
§ 371 (c)(1),
(2) Date: Aug. 8, 2017

(87) PCT Pub. No.: WO2016/130565
PCT Pub. Date: Aug. 18, 2016

(65) Prior Publication Data
US 2018/0022197 A1 Jan. 25, 2018

Related U.S. Application Data

(60) Provisional application No. 62/113,950, filed on Feb. 9, 2015.

(51) Int. Cl.
*B60B 19/14* (2006.01)
*B60K 1/02* (2006.01)
(Continued)

(52) U.S. Cl.
CPC ............... *B60K 1/02* (2013.01); *B25J 5/00* (2013.01); *B60B 19/14* (2013.01); *B60B 33/08* (2013.01);
(Continued)

(58) Field of Classification Search
None
See application file for complete search history.

(56) References Cited

U.S. PATENT DOCUMENTS 2,247,354 A 7/1941 Berger
3,648,408 A 3/1972 Terzian et al.
(Continued)

OTHER PUBLICATIONS

Armour, Rhodri H. et al., Rolling in Nature and Robotics: A Review, Journal of Bionic Engineering, 2006, vol. 3 No. 4, pp. 195-208.
(Continued)

*Primary Examiner* — Bentsu Ro
(74) *Attorney, Agent, or Firm* — Eleanor Musick; Musick Davison LLP

(57) ABSTRACT

A ball-balancing drive assembly includes a ball having a ball surface and a reference axis extending through a centroid of the ball. Three omniwheel assemblies, each having a motor with a motor axle and an omniwheel configured to rotate around the motor axle are mounted on a chassis configured for supporting the three omniwheel assemblies at radially symmetric spacings with the motor axles oriented at an angle relative to the reference axis and the omniwheels oriented in mutually-orthogonal planes. Each omniwheel frictionally contacts the ball surface to convert rotational motion of the motor axle to torque on the ball.

20 Claims, 13 Drawing Sheets

(51) Int. Cl.
  *B60B 33/08* (2006.01)
  *B60K 7/00* (2006.01)
  *B25J 5/00* (2006.01)
  *B62K 1/00* (2006.01)
(52) U.S. Cl.
  CPC ...... *B60K 7/0007* (2013.01); *B60K 2007/003* (2013.01); *B62K 1/00* (2013.01)

(56) References Cited

U.S. PATENT DOCUMENTS

| | | | |
|---|---|---|---|
| 4,736,826 A | | 4/1988 | White et al. |
| 5,279,170 A | | 1/1994 | Chen |
| 5,281,079 A | | 1/1994 | Lemelson |
| 5,297,981 A | | 3/1994 | Maxim et al. |
| 5,374,879 A | * | 12/1994 | Pin .................. B25J 5/007 180/21 |
| 5,618,219 A | | 4/1997 | Simone et al. |
| 5,741,169 A | | 4/1998 | Chen |
| 6,066,026 A | | 5/2000 | Bart et al. |
| 6,068,073 A | | 5/2000 | Roston et al. |
| 6,135,228 A | * | 10/2000 | Asada .................. A61G 5/046 180/168 |
| 6,227,934 B1 | | 5/2001 | Isaksson et al. |
| 6,247,546 B1 | | 6/2001 | Spletzer et al. |
| 6,289,263 B1 | | 9/2001 | Mukherjee |
| 6,308,791 B1 | | 10/2001 | Spletzer et al. |
| 6,502,657 B2 | | 1/2003 | Kerrebrock et al. |
| 6,548,982 B1 | | 4/2003 | Papanikolopoulos et al. |
| 6,668,951 B2 | | 12/2003 | Won |
| 6,793,026 B1 | | 9/2004 | De Fazio |
| 6,896,078 B2 | | 5/2005 | Wakui |
| 6,939,197 B1 | | 9/2005 | Hoeting |
| 7,004,269 B2 | | 2/2006 | Song et al. |
| 7,011,171 B1 | | 3/2006 | Poulter |
| 7,013,200 B2 | * | 3/2006 | Wakui .................. G05D 1/0272 180/7.1 |
| 7,158,860 B2 | * | 1/2007 | Wang .................. G06F 19/3418 700/245 |
| 7,172,488 B2 | | 2/2007 | Moll et al. |
| 7,249,640 B2 | | 7/2007 | Horchler et al. |
| 7,263,955 B1 | | 9/2007 | Fischer |
| 7,494,398 B2 | | 2/2009 | Laurienzo |
| 7,581,605 B2 | | 9/2009 | Caspi et al. |
| 7,600,593 B2 | | 10/2009 | Filippov et al. |
| 7,654,348 B2 | | 2/2010 | Ohm et al. |
| 7,719,222 B2 | | 5/2010 | Theobald |
| 7,882,915 B1 | | 2/2011 | Wishart |
| 7,980,336 B2 | | 7/2011 | Takenaka et al. |
| 8,010,232 B2 | | 8/2011 | Nakajima et al. |
| 8,083,013 B2 | | 12/2011 | Bewley et al. |
| 8,186,469 B2 | | 5/2012 | Yim et al. |
| 8,321,053 B2 | | 11/2012 | Ruan et al. |
| 8,393,422 B1 | | 3/2013 | Pensel |
| 8,485,936 B2 | | 7/2013 | Makulec et al. |
| 8,875,815 B2 | | 11/2014 | Terrien et al. |
| 9,020,639 B2 | | 4/2015 | Bewley et al. |
| 9,150,263 B2 | | 10/2015 | Bernstein et al. |
| 2001/0031604 A1 | | 10/2001 | Hornsby et al. |
| 2002/0189871 A1 | | 12/2002 | Won |
| 2004/0000439 A1 | | 1/2004 | Burt et al. |
| 2004/0050191 A1 | | 3/2004 | Chung |
| 2004/0182614 A1 | * | 9/2004 | Wakui .................. B25J 5/007 180/7.1 |
| 2006/0045679 A1 | | 3/2006 | Ostendorff |
| 2006/0046612 A1 | | 3/2006 | Laurienzo |
| 2007/0150110 A1 | | 6/2007 | Delson |
| 2007/0193790 A1 | | 8/2007 | Goldenberg et al. |
| 2007/0199108 A1 | | 8/2007 | Angle et al. |
| 2007/0259602 A1 | | 11/2007 | Dunham |
| 2008/0084175 A1 | | 4/2008 | Hollis |
| 2008/0179115 A1 | | 7/2008 | Ohm et al. |
| 2008/0231221 A1 | | 9/2008 | Ogawa |
| 2008/0231222 A1 | | 9/2008 | Hashimoto et al. |
| 2008/0283311 A1 | | 11/2008 | Li |
| 2010/0116566 A1 | | 5/2010 | Ohm et al. |
| 2010/0122859 A1 | | 5/2010 | Schroll |
| 2010/0258365 A1 | | 10/2010 | Jacobsen |
| 2011/0071677 A1 | | 3/2011 | Stilman |
| 2011/0231013 A1 | | 9/2011 | Smoot et al. |
| 2011/0263377 A1 | | 10/2011 | Wu et al. |
| 2012/0185087 A1 | | 7/2012 | Kang |
| 2012/0215355 A1 | | 8/2012 | Bewley et al. |
| 2012/0261204 A1 | | 10/2012 | Won |
| 2013/0330162 A1 | | 12/2013 | Horinouchi |
| 2014/0278221 A1 | | 9/2014 | Troy et al. |
| 2015/0210329 A1 | | 7/2015 | Hutcheson et al. |

OTHER PUBLICATIONS

Au, K.W. et al., Decoupled Dynamics and Stabilization of Single Wheel Robot, Proceedings of the 1999 IEEE/RSJ International Conference on Intelligent Robots and Systems (IROS '99), Oct. 1999, pp. 197-203.
Brown Jr., H. Benjamin et al., A Single-Wheel, Gyroscopically Stabilized Robot, IEEE Robotics & Automation Magazine, Sep. 1997, pp. 39-44.
Crossley, Vincent A., A Literature Review on the Design of Spherical Rolling Robots, citeseerxist.psu.edu, 2006, pp. 1-6.
Kumagai, Masaaki et al., Development of a Robot Balancing on a Ball, International Conference on Control, Automation and Systems 2008, Oct. 14-17, 2008, COEX, Seoul, Korea, pp. 433-438.
Lauwers, T.B., A Dynamically Stable Single-Wheeled Mobile Robot with Inverse Mouse-Ball Drive, Proceedings of the 2006 IEEE International Conference on Robotics and Automation, Orlando, Florida, May 2006, pp. 2884-2889.
Nandy, Gora C. et al., Dynamic Model of a Gyroscopic Wheel, Proceedings of the 1998 IEEE International Conference on Robotics & Automation, Leuven, Belgium, May 1998, pp. 2683-2688.
Ou, Yongsheng et al., Gyroscopically Stabilized Robot: Balance and Tracking, International Journal of Advanced Robotic Systems, 2004, vol. 1 No. 1, ISSN 1729-8806, pp. 23-32.
PCTUS2016017175, International Search Report and Written Opinion dated Apr. 22, 2016, 9 pages.
Schmidt-Wetekam, Christopher et al. Design, Optimization, and Control of a New Class of Reconfigurable Hopping Rovers, Proceedings of the 46th IEEE Conference on Decision and Control, New Orleans, LA USA, Dec. 12-14, 2007, pp. 5150-5155.
Schmidt-Wetekam, Christopher et al. Inertial Rotation Center Position Estimation for a Perching Treaded Vehicle, 2011 IEEE/RSJ International Conference on Intelligent Robots and Systems, Sep. 25-30, 2011, San Francisco, CA US, pp. 4097-4102.
Schmidt-Wetekam, Christopher et al., An Arm Suspension Mechanism for an Underactuated Single Legged Hopping Robot, 2011 IEEE International Conference on Robotics and Automation, Shanghai International Conference Center, May 9-13, 2011 Shanghai China, pp. 5529-5534.
Srivastava, Deepak Kumar, Slow Rotation of Concentric Spheres with Source at Their Centre in a Viscous Fluid, Hindawi Publishing Corporation, Journal of Applied Mathematics, 2009, vol. 2009, Article ID 740172, 13 pages.
Tsai, Shu-Jen et al., Control of the Gyrover, A Single-Wheel Gyroscopically Stabilized Robot, Proceedings of the IEEE/RSJ International Conference on Intelligent Robots and Systems (IROS'99), Oct. 1999, pp. 179-184.
Xu, Yangsheng et al., Dynamic Mobility with Single-Wheel Configuration, The International Journal of Robotics Research, vol. 18, No. 7, Jul. 1999, pp. 728-738.
Ylikorpi, Tomi et al., Ball-shaped Robots, Climbing & Walking Robots, Towards New Applications, Book edited by Houxiang Zhang, ISBN 978-3-902613-16-5, Itech Education and Publishing, Vienna, Austria, Oct. 2007, pp. 235-256.

* cited by examiner

BALL-BALANCING ROBOT AND DRIVE ASSEMBLY THEREFOR

RELATED APPLICATIONS

This application is a 371 national stage filing of International Application No. PCT/US2016/017175, filed Feb. 9, 2016, which claims the benefit of the priority of U.S. Application No. 62/113,950, filed Feb. 9, 2015, which is incorporated herein by reference in its entirety.

FIELD OF THE INVENTION

The present invention relates to a mobile robot and more particularly to a dynamically-stable, ball-balancing robot.

BACKGROUND

Mobile robots can be broadly categorized as statically stable, e.g., stable when unpowered, and dynamically stable, e.g., stable only when powered. Statically stable robots generally have at least three wheels. A significant but frequently overlooked problem is that statically stable wheeled mobile robots can easily become unstable. If the center of gravity is too high, or the robot accelerates/decelerates too rapidly, or is on a sloping surface, or is pushed too hard, the robot can tip over. Thus, statically stable wheeled robots tend to have low centers of gravity and large bases. However, short, wheeled robots having large bases do not interact well with humans and have trouble maneuvering in environments that are crowded or cluttered.

A ball-balancing robot, or BBR, also known as a "ballbot", is a dynamically-stable mobile robot designed to balance on a single spherical wheel (i.e., a ball). Through its single contact point with the ground, a ballbot is omnidirectional and thus exceptionally agile, maneuverable and organic in motion compared to other ground vehicles. Its dynamic stability enables improved navigability in narrow, crowded and dynamic environments. The BBR works on the same principle as that of an inverted pendulum. It forms an underactuated system, in which there are more degrees of freedom (DOF) than there are independent control inputs. The ball is directly controlled using actuators, whereas the body has no direct control. The body is kept upright about its unstable equilibrium point by controlling the ball, much like the control of an inverted pendulum. This leads to limited but perpetual position displacements of the BBR. The counter-intuitive aspect of the BBR motion is that in order to move forward, the body has to lean forward and in order to lean forward, the ball must roll backwards. All these characteristics make planning to achieve desired motions for the ballbot a challenging task. In order to achieve a forward straight line motion, the ballbot has to lean forward to accelerate and lean backward to decelerate. Further, the ballbot must lean into curves in order to compensate for centripetal forces, which results in elegant and graceful motions.

BBRs exhibit rich 3D dynamics and are capable of fluid and graceful motion. Early research on BBRs appeared around 2006. The first successful ballbot was developed by Hollis and co-workers at Carnegie Mellon University (CMU), and is described in U.S. Pat. No. 7,847,504, which is incorporated herein by reference. This robot is also described by T. B. Lauwers, et al. in "A Dynamically Stable Single-Wheeled Mobile Robot with Inverse Mouse-Ball Drive", *Proc. of the* 2006 *IEEE Int'l Conf. on Robotics and Automation*, Orlando, Fla., May 2006, pp. 2884-2889. The described robot applies two roller bars to drive the ball in any direction but does not accommodate the ability to spin in place as the rollers used in the prior art act in interference of one another.

The omniwheel drive mechanism described by Wu et al. in U.S. Pat. No. 8,485,938, the disclosure of which is incorporated herein by reference, utilizes sets of guide rollers on axles that are arranged perpendicular to each other, i.e., 90° apart, so that the guide rollers contact the surface of the spherical wheel oriented to effectively define a cross pattern on the wheel that intersects a line corresponding to the wheel's north pole. The vertical positioning of the guide rollers limits the ability to spin in place.

Other ballbots have been described in the literature, including one developed by M. Kumagai and T. Ochiai, "Development of a Robot Balancing on a Ball", *Int'l Conf. on Control, Automation and Systems* 2008, Oct. 14-17, 2008, Seoul, Korea, pp. 433-438. This robot uses a single angle in engaging the ball while maintaining the drive motors vertically. This arrangement limits the mobility of the robot, and makes it difficult to spin in place. (The disclosures of both identified publications are incorporated herein by reference.)

To date, most BBR research has focused on human-scale designs, ball-balancing transportation vehicles, and knee-high to waist-high designs. A smaller scale robot, such as would be useful for entertainment, i.e., toys, service, education and research, is referred to as a "micro ball-balancing robot", or "MBBR", pronounced "Ember."

There are significant challenges and limitations to contend with when attempting to miniaturize a BBR. Tolerances become more stringent and cross-sectional areas decrease, lowering the yield strength of mechanical components. Scaling down the characteristic length scale (l) of a given design generally reduces the volume and mass of the design by $l^3$; on a BBR, this significantly reduces the normal force between the omniwheels and the ball, creating problems with slip. Simultaneously, the time scale of the non-minimum-phase inverted-pendulum dynamics of a BBR is $\sqrt{l/g}$, so as l is reduced, the time scale decreases, and the actuators must respond more quickly, further exacerbating the slip problem. In extreme cases, the drive wheels may even lose contact with the ball completely for short periods of time.

Earlier work on BBRs fall into two main categories: those driven by an inverse mouseball mechanism, and those driven by three omniwheels. In principle, neither category presents obvious barriers to miniaturization. The inverse mouseball mechanism relies on two perpendicular rollers that roll along the equator of the ball. A small, low-friction bearing is used at the top of the ball to support the weight of the upper body. Spring-loaded idler wheels at opposite points along the equator press the rollers against the ball to create enough friction to eliminate slip between the rollers and the ball. This allows the rollers to actuate the ball in the two horizontal directions independently.

There are two key problems with MBBRs driven by an inverse mouseball mechanism. The first was contamination. During testing, dirt and rubber particles can build up on the support bearing, idler wheels, and drive rollers. This increases friction and degrades performance to the point of failure. For large BBRs, the torques and forces involved are greater in magnitude, and tolerances are relaxed, so a thin layer of dirt has little effect on performance. However, for an MBBR, dirt buildup on the rotating components can be a critical point of failure.

A second problem encountered was the ball being pushed out of the socket during maneuvers. The rollers transmit torque to the ball by applying a friction force along the ball's equator. Depending on the direction of rotation, this force tends either to push the ball further into the socket, or to pull the ball away from the socket. The only force preventing the ball from leaving the socket is the weight of the robot itself. Since MBBRs have reduced mass, their weight is generally insufficient to keep the ball in the socket. Even if the ball does not leave the socket, the design suffers from asymmetric friction. As the roller actuates the ball in one direction, the ball is forced into the socket, increasing both the normal force and the friction at the top support bearing. When actuating the ball in the opposite direction, the friction at the top support bearing is reduced. Additionally, the inverse mouseball mechanism does not control the yaw of the robot about its vertical axis, so additional actuators would be needed to make the robot face in a desired direction. Given its significant problems, an inverse mouseball mechanism cannot be considered a viable choice for an MBBR.

SUMMARY OF THE INVENTION

In an exemplary embodiment, a standard ball balancer using three omniwheels provides improved mobility by using three wheels, separating the wheels by 120° degrees around the north pole of the ball, using a wheel contact point at 45° from the north pole, and positioning the wheels perpendicular to the ball. In one embodiment, the ball-balancing robot (BBR) uses three uniquely placed motor driven wheels to drive the ball as well as allow the robot to spin in place over the ball or spin in combination with movement in any direction. The combination of motion within the X-Y plane and spinning gives the robot the ability to glide across the floor or other surface.

In one aspect of the invention, a dynamic balancing robot includes a ball having a ball surface and a reference axis corresponding to a north pole; a body portion disposed above the ball; three wheels disposed uniformly around the reference axis perpendicular to the ball surface, each wheel having an axle disposed at an angle relative to the reference axis; three motors mounted on the body portion, one motor configured for rotating each wheel; and a power supply for supplying power to said motors.

According to some embodiments of the invention, a BBR employs mid-latitude placement of the omniwheels, near the equator of the spherical ball. In some embodiments, the omniwheels are configured in a mutually-orthogonal orientation. The omniwheels may be mounted in a support frame in a single or double row arrangement. An ideal omniwheel assembly has the following features: zero friction in the direction of its axis, which is achieved using rollers around its circumference; zero friction resisting yaw about the contact patch; and zero slip (infinite stiction) in its direction of rotation.

In one aspect of the invention, a ball-balancing drive assembly includes a ball having a ball surface and a reference axis extending through a centroid of the ball; three omniwheel assemblies, each omniwheel assembly comprising a motor having a motor axle and an omniwheel configured to rotate around the motor axle; and a chassis configured for supporting the three omniwheel assemblies at radially symmetric spacings with the motor axles oriented at an angle relative to the reference axis and the omniwheels oriented in mutually-orthogonal planes, wherein each omniwheel frictionally contacts the ball surface to convert rotational motion of the motor axle to torque on the ball. In a preferred embodiment, the ball surface has an equator corresponding to a plane perpendicular to the reference axis that bisects the ball, wherein the omniwheels frictionally contact the ball surface within a mid-latitude range near the equator. In a particularly preferred embodiment, the mid-latitude range is 20° N to 30° N of the equator. The angle relative to the reference axis may be within a range of 45° to 80°, and is more preferably within a range of 60° to 70°. In some embodiments, the omniwheels are oriented mutually-orthogonally within a range of 35° to 55°, and more preferably within a range of 48° to 52°. The omniwheels may be single row omniwheels or double row omniwheels.

The ball-balancing drive assembly may further include a frame extending from the chassis for supporting a power supply. A controller may be provided for selectively and independently activating each omniwheel assembly.

In another aspect of the invention, a ball-balancing robot includes a ball having a ball surface and a reference axis extending through a centroid of the ball; three omniwheel assemblies, each omniwheel assembly comprising a motor having a motor axle and an omniwheel configured to rotate around the motor axle; a chassis configured for supporting the three omniwheel assemblies at 120° spacings with the motor axles oriented at an angle α relative to the reference axis and the omniwheels rotated at an angle β to define mutually-orthogonal planes, wherein each omniwheel frictionally contacts the ball surface to convert rotational motion of the motor axle to torque on the ball; a frame extending upward from the chassis; a control assembly disposed on the frame, the control assembly comprising an electronic controller for selectively and independently activating the omniwheel assemblies; and a power supply for powering the motors and the control assembly. The ball surface has an equator corresponding to a plane perpendicular to the reference axis that bisects the ball, where the omniwheels frictionally contact the ball surface within a mid-latitude range near the equator. In some embodiments, the mid-latitude range is 20° N to 30° N of the equator. The angle α may be within a range of 45° to 80°, and is more preferably within a range of 60° to 70°.

The angle β may be within a range of 35° to 55°, more preferably within a range of 48° to 52°. In particularly preferred embodiment, the angle α and the angle β are selected as an angle pair. The omniwheels may be single row omniwheels or double row omniwheels. The ball-balancing robot may further include an outer skin configured for enclosing at least of portion of the frame, control assembly and power supply.

DETAILED DESCRIPTION OF EXEMPLARY EMBODIMENTS

Existing ball balancers do not have orthogonal wheel axes. By using orthogonal wheel axes and the omniwheels, it is possible to drive the wheels independently from each other. This means that the wheels are decoupled from each other and the ball can be driven in any direction with minimum interference in between the wheels. The wheels are swiveled such a way that they still maintain the constraints above and the three wheel axes are orthogonal.

The omniwheels can drive the ball in one direction and let any ball rotation perpendicular to this direction pass through with minimum friction because of the side rollers attached at the circumference of the wheel. So, perpendicular wheel axes has the advantage of having decoupled wheel motion, as in one wheel will not interfere with the other wheel.

Figure 1A:
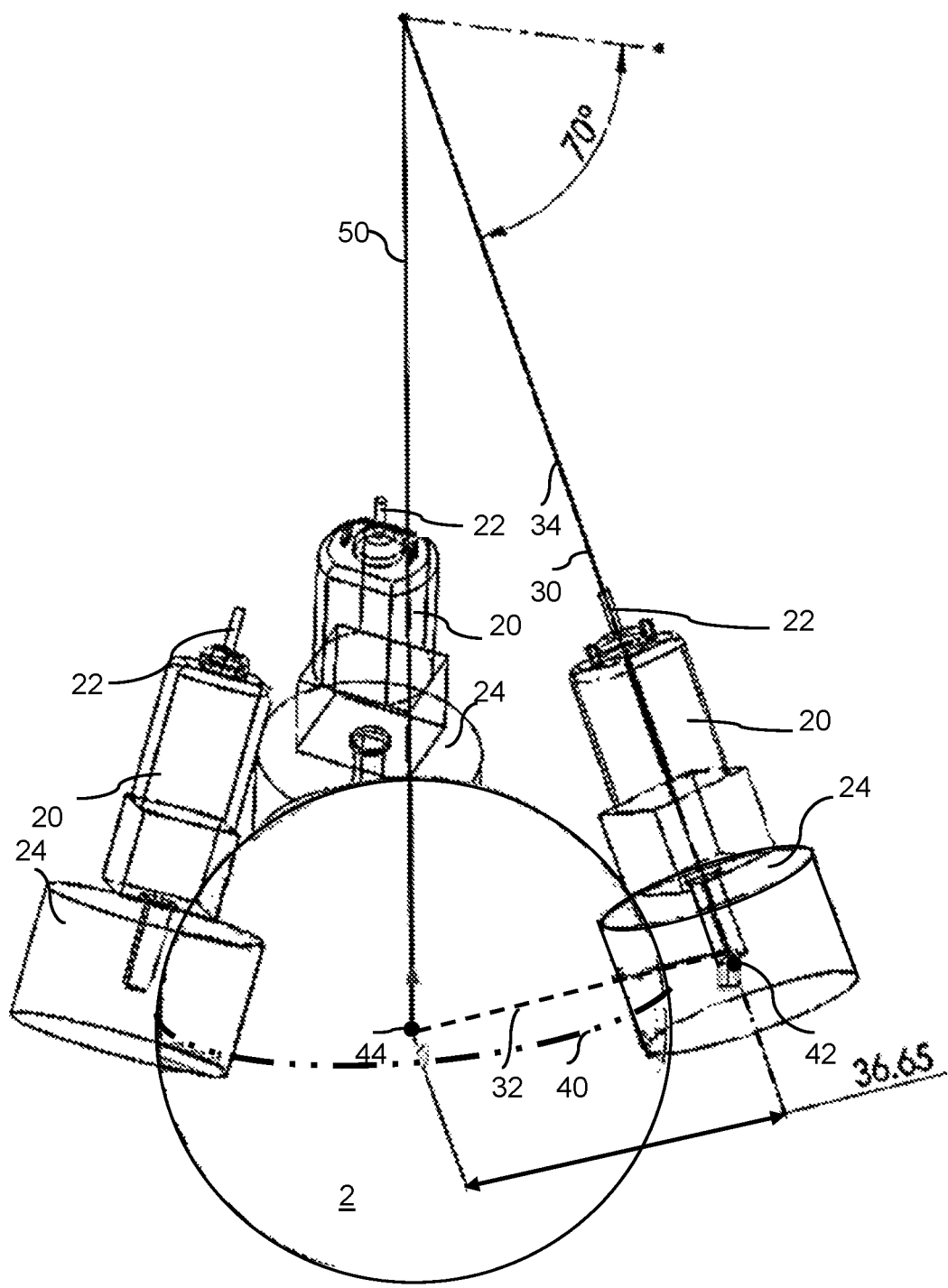
FIGS. 1A and 1B are diagrammatic perspective and top view, respectively, of an embodiment of the inventive omni-ball robot.
Figure 1B:
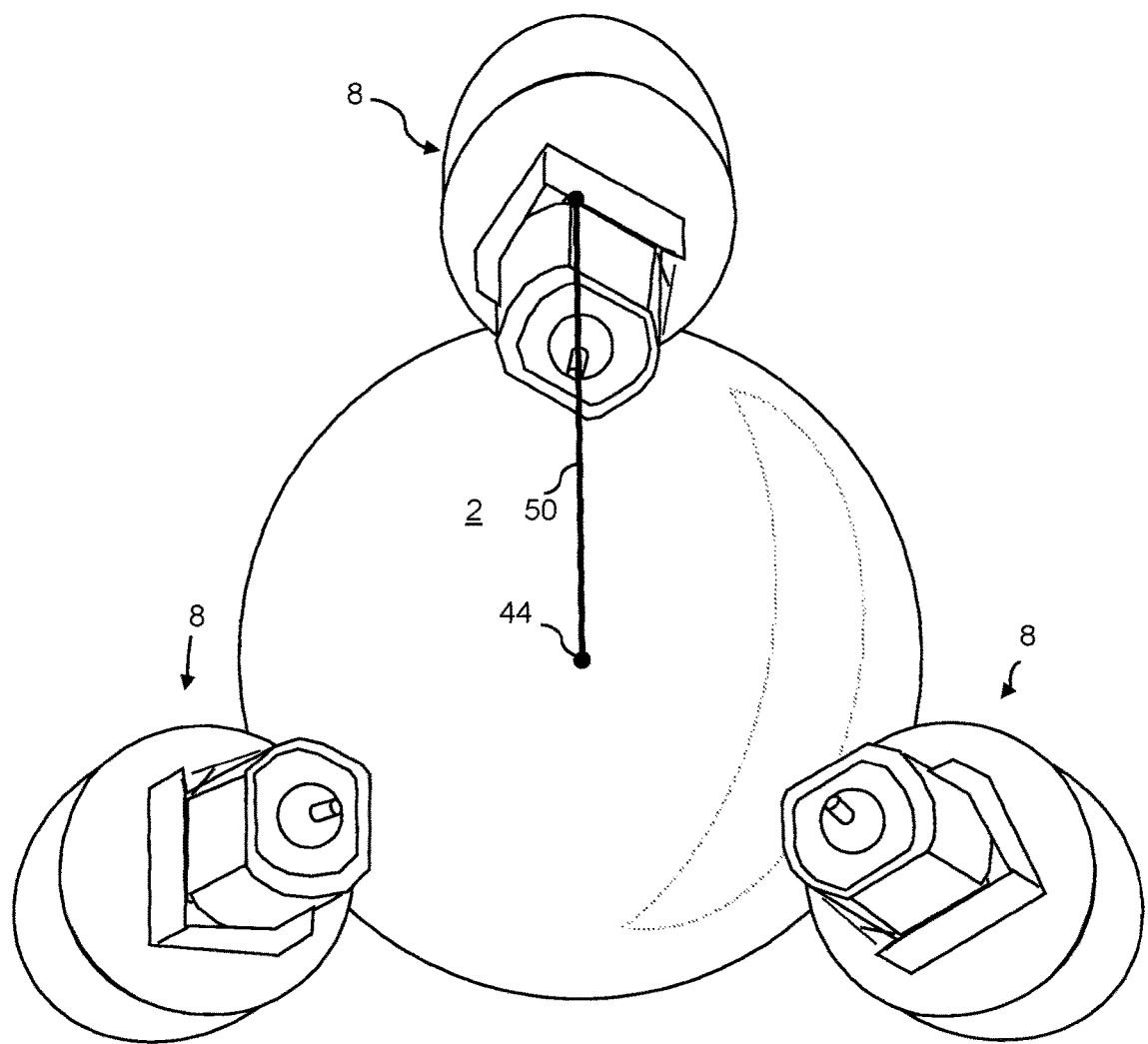
Figure 1C:
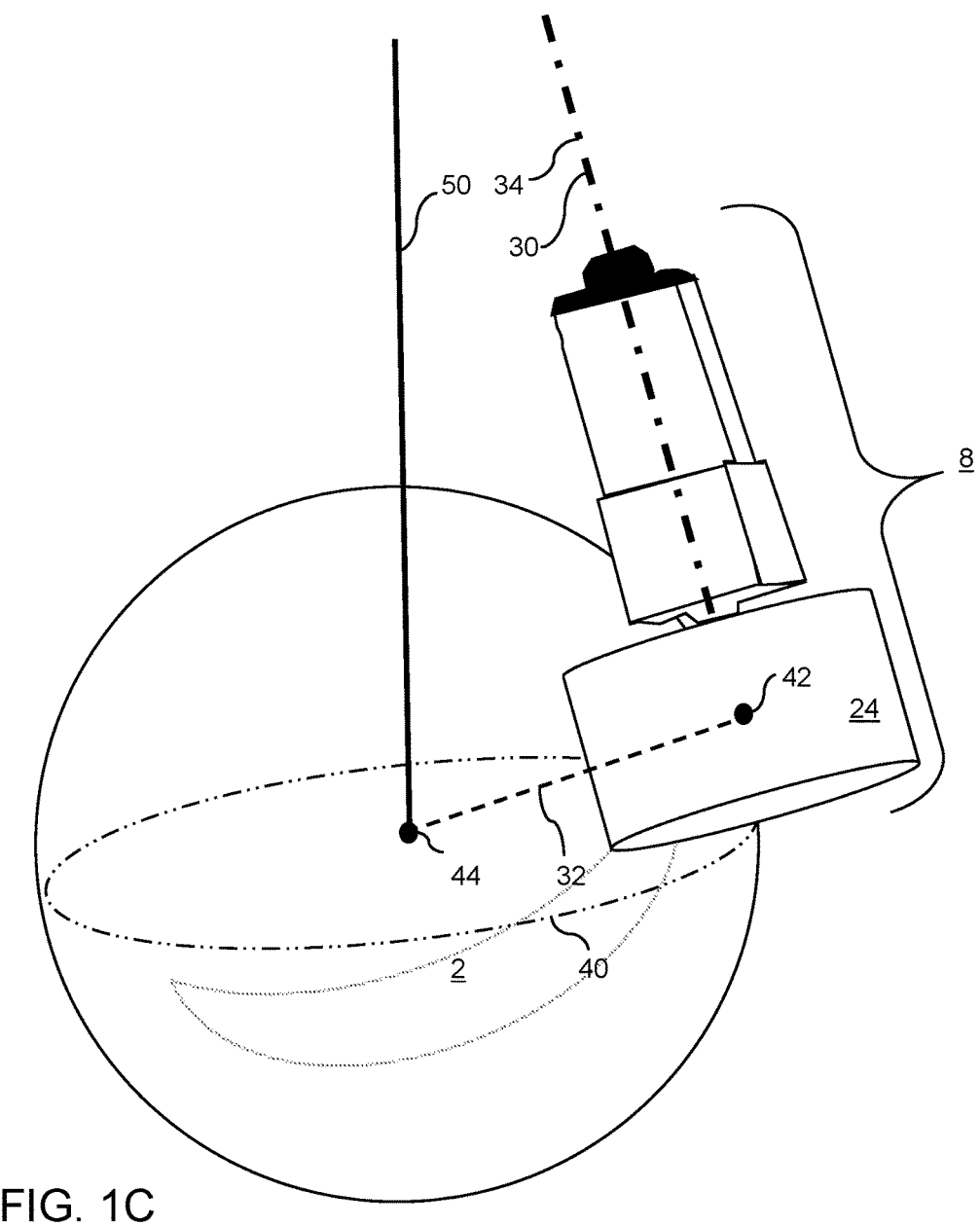
FIGS. 1C-1E diagrammatically illustrate a selection process for orientation of the omniwheels according to an embodiment of the invention.

FIGS. 1A-1E diagrammatically illustrate how to orient the omniwheels so that they are perpendicular. FIGS. 1A and 1B illustrate an isometric and top view, respectively, of the basic elements of the drive assembly 10, which includes spherical wheel 2, and three omniwheel assemblies 8. In each omniwheel assembly 8, the rotational axes 22 of motors 20 are oriented at an angle α of about 70° from the reference axis 50, which will be referred to herein as the "north pole", or "NP". The omniwheel assemblies 8 are retained in position by a frame or chassis, which is only shown in the later figures. As shown in FIG. 1B, the omniwheel assemblies 8 are symmetrically positioned 120° apart from each other with the respective wheels 24 in contact with the outer surface of spherical wheel 2 at the same "latitude" 52. For purposes of this description, "latitude" is used according to its common meaning, i.e., the angular distance of a position on the surface of the sphere relative to (north or south) of the equator. The equator 40, shown in FIGS. 1A and 1C, is defined as a circle on the surface of the sphere that corresponds to a plane that is perpendicular to the reference axis 50 that divides the sphere into halves, i.e., extending through the sphere's centroid 44.

To facilitate understanding of the novel positioning of the omniwheel assemblies, the following reference lines will be defined. For simplicity, the reference lines are provided only with respect to a single omniwheel assembly. It will be readily apparent that the same relationships would be used for each assembly.

As shown in FIG. 1C, line 30 runs between point 42, i.e., the lowest extent of axis 22 in each omniwheel assembly 8, and the north pole 50. Line 32 extends between point 42 (within wheel 24) and the centroid 44 of spherical ball 2. Line 34 corresponds to the axis 22 of each omniwheel assembly, extending from point 42 within wheel 24. At its initial position of β=0, in which the omniwheels are not mutually orthogonal, line 34 is coincident with line 30.

Figure 1D:
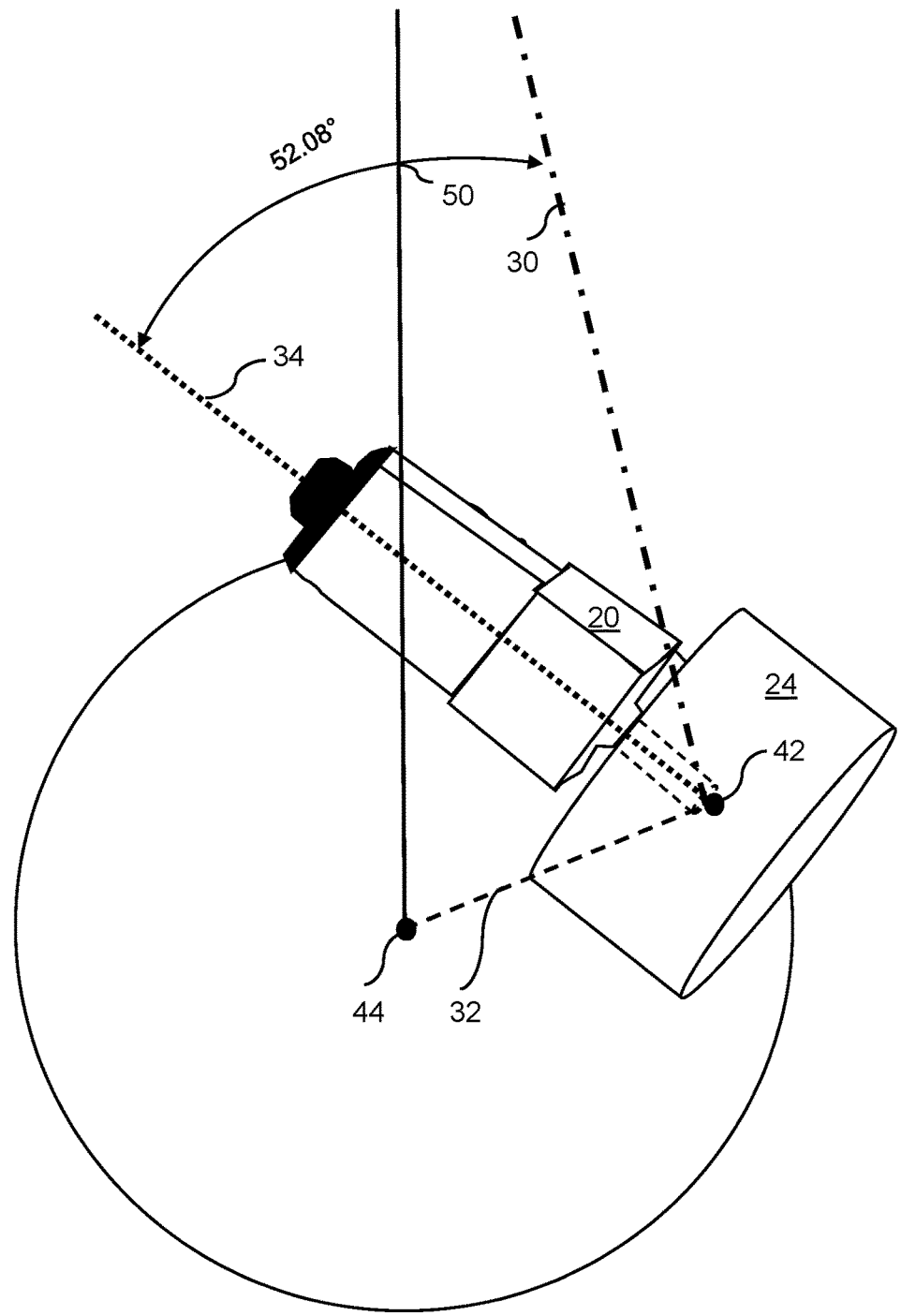
Figure 1E:
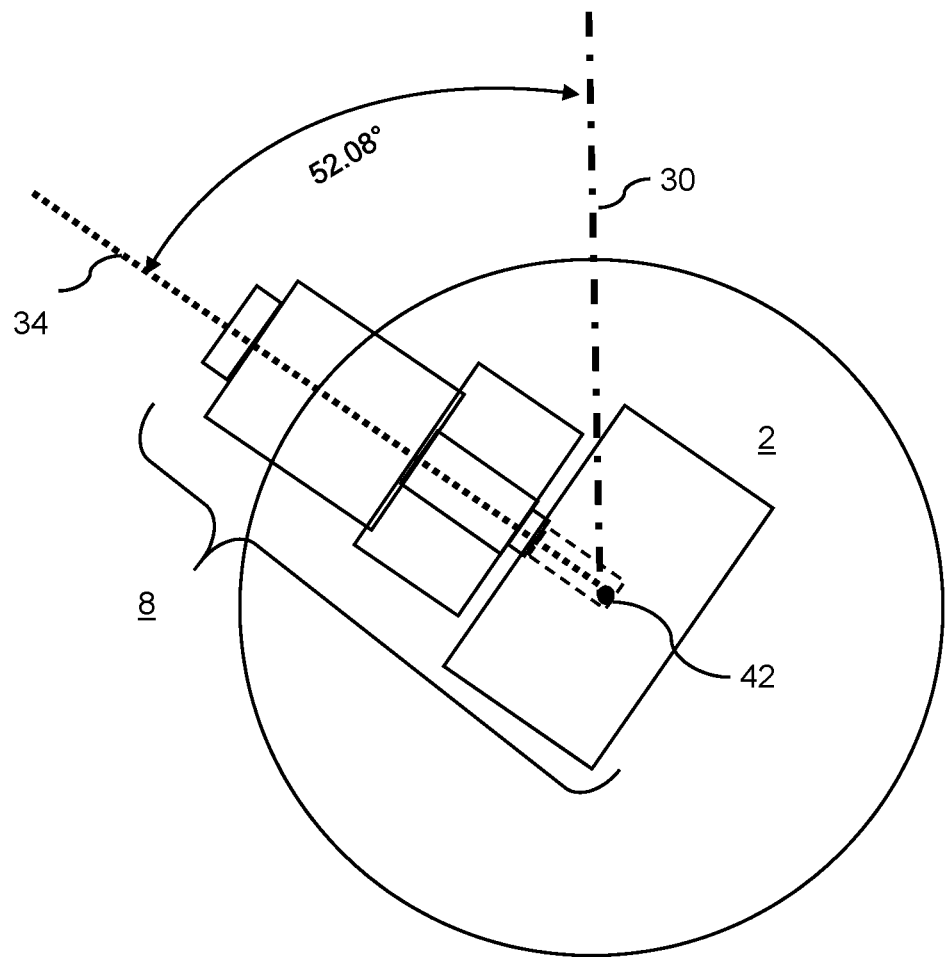

Starting with the orientation shown in FIG. 1C, the omniwheel assembly 8 is twisted or rotated around line 32, as shown in FIG. 1D, so that line 30 and line 34 are separated by angle β, which in this example is 52.082°. While FIG. 1D illustrates this configuration as a perspective view, FIG. 1E shows the same rotation viewed directly at the omniwheel assembly 8.

Figure 2A:
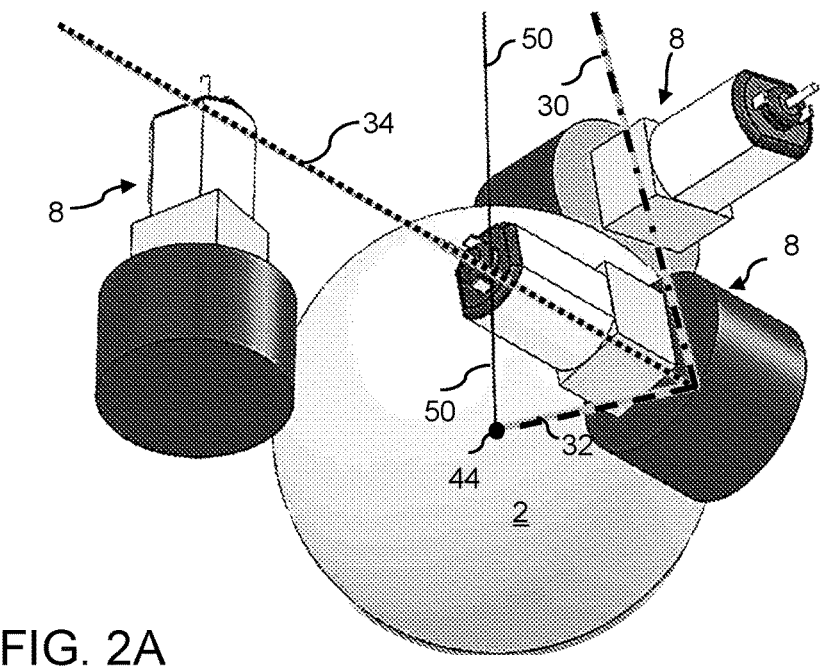
FIGS. 2A and 2B illustrate an exemplary perpendicular wheel setup with reference lines indicating relative angles.
Figure 2B:
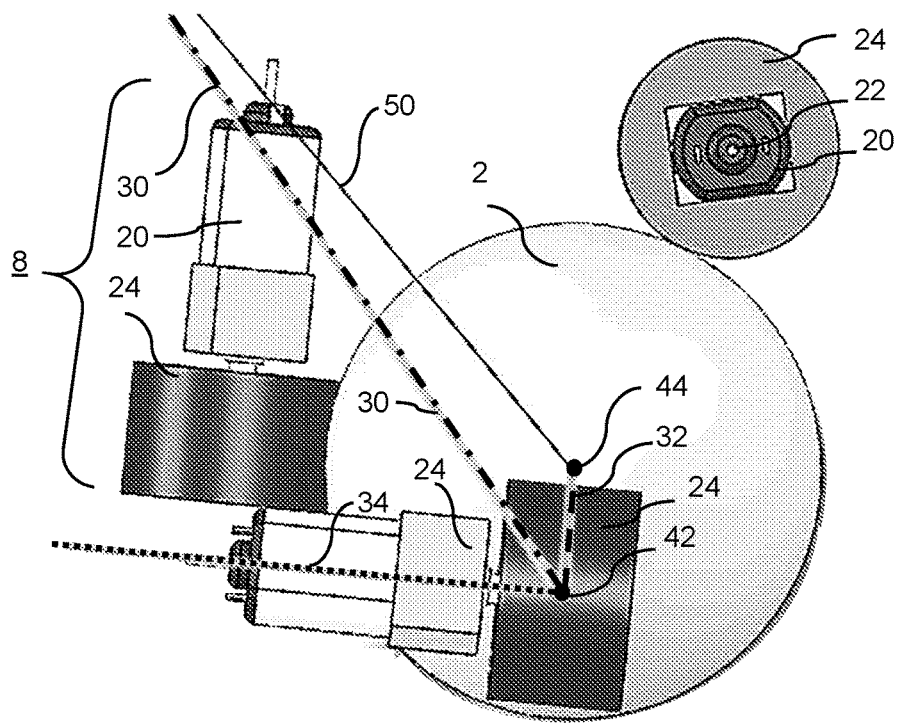

FIGS. 2A and 2B illustrate the perpendicular wheels setup, again with reference lines 30, 32 and 34 shown only with respect to one of the illustrated omniwheel assemblies 8. The motor rotates around line 34. The angle α refers to the motor axle angle from the north pole (NP) 50; the angle β refers to the amount of omniwheel twist:

TABLE 1

| Angle from NP (α) | β |
|---|---|
| 60 | 48.189 |
| 65 | 50.429 |
| 70 | 52.082 |

The ball can be driven in any direction using the superposition of the three wheel rotations. Since the wheels are decoupled, the superposition process is easy because the wheels do not interact with each other, resulting in less noise or disturbance in the system.

Also, by lowering the omniwheels to 70 degrees from the north pole, we increase the normal force on the omniwheels, reducing the change of ball/wheel slip. The equation for the normal force of the omniwheel is:

$$N = \frac{mg}{3\cos}\theta, \qquad (1)$$

where m is mass, g is acceleration due to gravity, and θ is the angle of the wheel relative to the reference axis, i.e., the north pole.

Thus, by choosing to position the omniwheels at 70° instead of 20° to 45° of previous BBR designs, we can double the normal force on the omniwheels. This low position is critical for lightweight and small BBR in order to prevent the ball from popping out of the socket and prevent the wheels from slipping.

Figure 3:
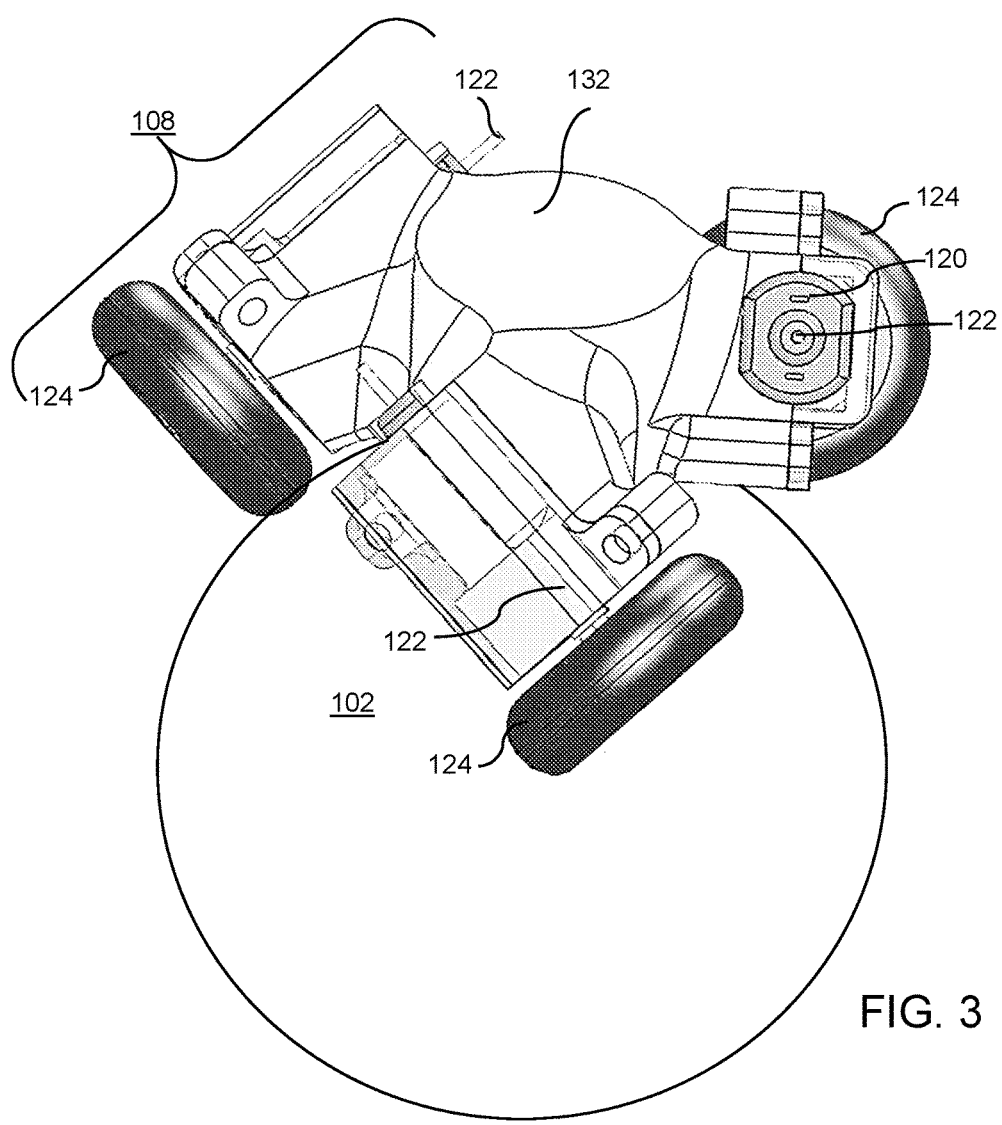
FIG. 3 is a diagrammatic perspective view of a first embodiment of an omniwheel robot.

FIG. 3 illustrates an exemplary embodiment of the inventive BBR. In this configuration, the BBR is driven by using three identical omniwheel assemblies 108 mounted on a support frame 132, each assembly including a wheel 124, a motor 120 and an axle 122 (also the rotational axis). Briefly, operation of the robot uses the same principles as the prior art ballbots: each wheel 124 rotates around a motor-drive axle. Friction between the wheel's edge and ball 102 impart torque on the ball, causing the ball to rotate, propelling the robot. The difference is that the ballbots reported in the prior art do not use a perpendicular axes approach as described above and used herein. The improved perpendicular wheel axes configuration provides significant advantages over existing designs. The improvement lies in the positioning of the wheels so that the axle is at an angle relative to the north pole of the ball and the plane of rotation of the wheels is perpendicular to the ball. The inventive approach can be achieved by calculating the angle needed to achieve the perpendicular axes while also having 120 degree wheel separation, 45 degree angle from north pole and wheels perpendicular to the ball.

Figure 4A:
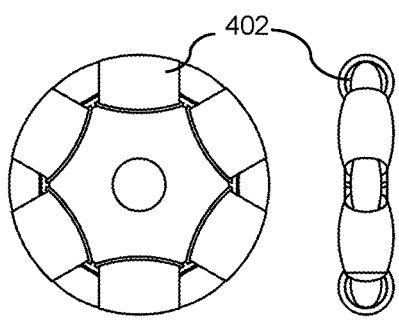
FIGS. 4A and 4B illustrate exemplary single and double row omniwheel arrangements, respectively.
Figure 4B:
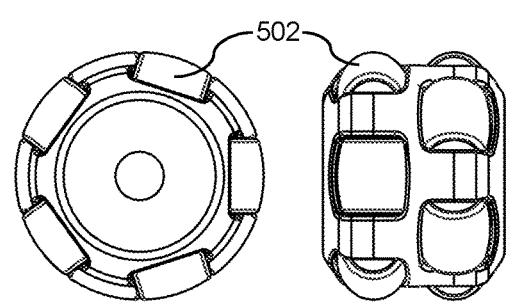

FIGS. 4A and 4B illustrate two possible omniwheel designs for use in a BBR according to an embodiment of the invention. FIG. 4A provides plan and side views of a conventional single row ("SROW") omniwheel 402, while FIG. 4B shows plan and side views of a conventional double row (DROW") omniwheel 502. For purposes of constructing a prototype MBBR, omniwheels were custom-fabricated. Due to manufacturing tolerances and material strength limitations, the smallest omniwheels that could be fabricated were 2.5 cm in diameter.

The SROW design 402 included twelve rollers lying in the same plane. The rollers alternate between large and small, allowing the smaller rollers to nest within the larger rollers to form a nearly circular profile. In practice, SROWs allowed for very smooth actuation of the ball due to the absence of gaps between rollers and the single contact point on the ball. A few drawbacks were also encountered: first, the design complexity is high, with thirty-seven parts per wheel, which increases the manufacturing cost significantly. Additionally, to achieve the desired scale, parts of the hub had to be made as thin as 1 mm, making them prone to mechanical failure.

The DROW design (FIG. 4B) included twelve equally-sized rollers arranged in two parallel planes, which greatly simplified the construction. Although the part count is still relatively high, the individual pieces were larger and more robust. The drawback of the DROW design lies in the differences in the engagement of the two different rows on the curved surface of the ball. On flat surfaces, a DROW behaves much like a SROW. However, in MBBRs, as the ratio between the ball diameter and the distance between the two rows of rollers becomes smaller, the omniwheels induce a characteristic "wobble" into the dynamics, as demonstrated below.

Figure 5:
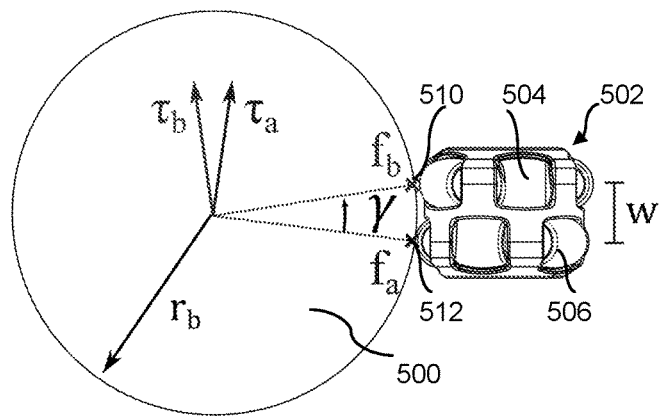
FIG. 5 illustrates omniwheel and ball contact interaction for an exemplary double row embodiment.

As illustrated in FIG. 5, as the DROW 502 rotates, the normal force $f_a$ generated by the DROW on the ball 500 creates (via stiction (static friction)) a torque on the ball, $\tau_a$, in a direction perpendicular to both $f_a$ and the azimuthal direction of the omniwheel. As the omniwheel continues to rotate, the second roller contacts the ball, resulting in a normal force $f_b$ and concomitant torque on the ball, $\tau_b$. It is thus seen that the torque that the DROW 502 generates on the ball switches back and forth between $\tau_a$ and $\tau_b$. This switching induces a periodic disturbance that leads to an undesirable "wobble". The angle between the two axes of rotation in the DROW is given by $$\sin(\gamma) = w/(2r_b), \quad (2)$$

where $\gamma$ is the angle between the contact points 510, 512 on the ball 500 of the rows of rollers 504, 506 and $r_b$ is the radius of ball (sphere) 500. As the ratio between the radius of the ball and the distance between the two rows of rollers 504, 506 in the DROW increases, wobble diminishes, as verified in the discussion below. In practice, we found both the SROW and DROW designs viable for miniaturization, though neither was perfect.

Figures 6A, 6B:
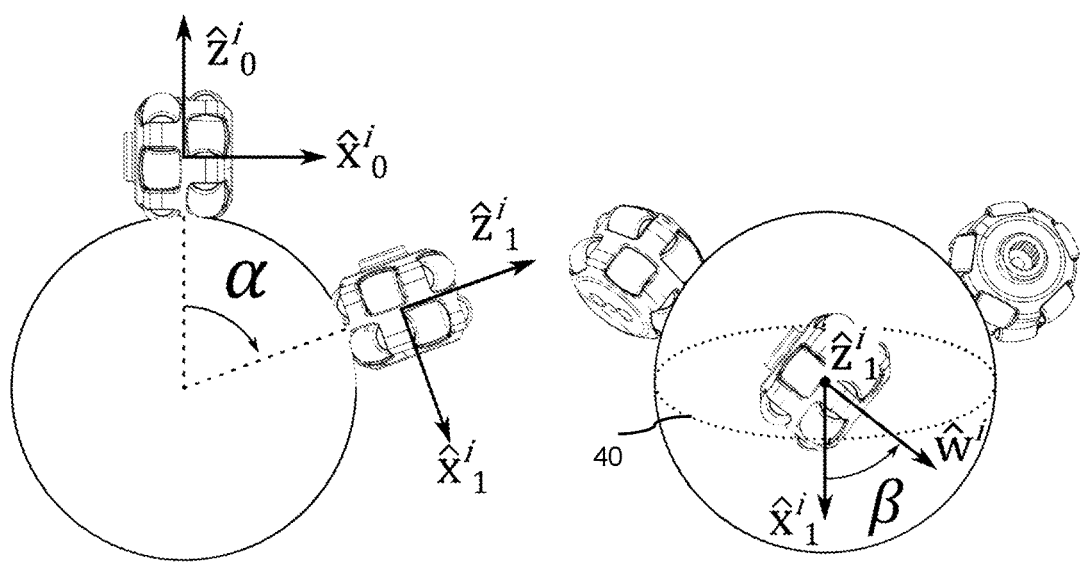
FIGS. 6A and 6B illustrate omniwheel placement and orientation showing angle from the north pole and angle of twist, respectively.

Following the work of others, the omniwheel-driven MBBR prototypes placed the omniwheels between $\alpha=30°$ and $\alpha=45°$, as shown in FIG. 6A, and took $\beta=0°$, as shown in FIG. 6B. With the omniwheels in such a position, we found that slippage between the DROW and the ball was significant. To mitigate this problem, the friction between the wheel and the ball must be increased. There are two ways to accomplish this: increase the coefficient of friction between the ball and rollers, or increase the normal force between the omniwheels and the ball. Since there are limited options in materials, and it is undesirable to increase normal force by adding mass to the main body, we sought other solutions to this problem. We found that placing omniwheels closer to the equator 40 of the ball (that is, in the "mid-latitudes" between around 10° to 40° N of the equator), could greatly increase the normal force between the ball and omniwheels. Optimal results were obtained from about 20° to 30° N latitude. The normal force, provided above in Equation (1), is:

$$N = mg/[3 \cos(\alpha)].$$

The normal force monotonically increases as $\alpha$ increases from near 0° to near 90°. Thus, by moving the omniwheels from $\alpha=45°$ to 70°, we can double the normal force between the omniwheels and without adding any mass. This simple geometric change significantly mitigated the omniwheel slippage issues. Note that if $\alpha$ becomes too large, the amplified normal forces increase friction in the drivetrain, and degrades performance.

We built several prototypes, with $\alpha=\{45°, 60°, 70°, 80°\}$, and found that, for our design, $\alpha$ in a range of 60° to 70° provided good results. The lower placement of the omniwheels also effectively solved the problem of the omniwheels losing contact with the ball during quick maneuvers. Lowering the omniwheels result in larger normal forces, which allows the omniwheels to grip the ball better, and the contact points upon which the upper body rests are spaced farther apart, requiring a larger moment to tip the upper body off the ball.

Problems can arise when lowering the omniwheel placement if the orientation of the omniwheels is left in the conventional, non-mutually orthogonal orientation with $\beta=0$. The magnitude of the component of the torque that contributes to the yaw of the ball about the vertical axis scales with $\sin(\alpha)$. Conversely, the magnitude of the components of torque that contribute to translational movement of the ball scales with $\cos(\alpha)$. Thus, as $\alpha$ approaches 90°, the actuator input corresponding to balancing the vehicle approaches 0, and balancing becomes impossible. A natural solution to this problem is achieved by varying $\beta$, as discussed below.

We now consider the issue of the omniwheel orientation $\beta$. One possible solution is to mount the omniwheels in mutually-orthogonal planes, which increases the overall efficiency of the power transfer and, as discussed above, is desirable when used in conjunction with mid-latitude omniwheel placement.

Traditionally, omniwheels are spaced evenly apart, with 120° separation, and oriented in a radially-symmetric fashion about the z-axis, with $\beta=0°$. By aligning the three omniwheels in mutually-orthogonal planes, we effectively decouple their effects.

If the omniwheels are not in mutually orthogonal planes, actuating one omniwheel while holding the other two fixed results in both rolling of the ball about an axis $\tau$ parallel to that of the actuated omniwheel, and rolling about the other two axes, which gives no slip in the direction of rotation of the other two omniwheels. This is achieved by spinning the rollers of all three omniwheels, including the actuated omniwheel.

If, on the other hand, the omniwheels are in mutually orthogonal planes, actuating one while holding the other two fixed results in pure rolling of the ball about an axis $\tau$ parallel to that of the actuated omniwheel, and zero rolling about the other two axes. This is more direct and efficient, as it does not result in the spinning of the roller of the actuated omniwheel.

The inventive approach to enforce orthogonal omniwheel orientation follows: let the torque produced by each motor on the omniwheel $i \in \{1, 2, 3\}$ be represented by $\tau^i = \tau_i \hat{w}^i$ where the scalar $\tau_i$ is the magnitude of the torque, and $\hat{w}^i = (\hat{w}_x^i, \hat{w}_y^i, \hat{w}_z^i)^T$ is the unit vector in the direction of the vector $\tau^i$. The actuators $\tau_i$ contribute to the three components of torque in the upper body coordinates as follows:

$$\begin{pmatrix} \tau_x \\ \tau_y \\ \tau_z \end{pmatrix} = \frac{r_b}{r_w} \sum_{i=1}^{3} \tau^i = \frac{r_b}{r_w} (\hat{w}^1 | \hat{w}^2 | \hat{w}^3) \begin{pmatrix} \tau_1 \\ \tau_2 \\ \tau_3 \end{pmatrix}, \quad (3)$$

$$T_w = (\hat{w}^1 | \hat{w}^2 | \hat{w}^3), \quad (4)$$

where the $r_b$ and $r_w$ are the radius of the ball and omniwheel, respectively, the matrix $T_w$ is invertible, and the torques $\tau_x$, $\tau_y$, and $\tau_z$ represent the torques in the upper body coordinates. The ball rotation can also be computed using this transformation from the omniwheel rotation values measured by the encoders. Defining $\tau = (\tau_x, \tau_y, \tau_z)^T$, $\tau_w = (\tau_1, \tau_2, \tau_3)^T$, $\Phi = (\phi_x, \phi_y, \phi_z)^T$, and $\Phi_w = (\phi_1, \phi_2, \phi_3)^T$, yields $$\tau = (r_b/r_w) T_w \tau_w, \quad (5)$$

$$\Phi = (r_w/r_b) T_w \Phi_w, \quad (6)$$

where $\phi_x$, $\phi_y$, and $\phi_z$ are the ball rotation in the upper body coordinates, and $\phi_1$, $\phi_2$, $\phi_3$ are the omniwheels rotational values as measured by the encoders.

Figure 7:
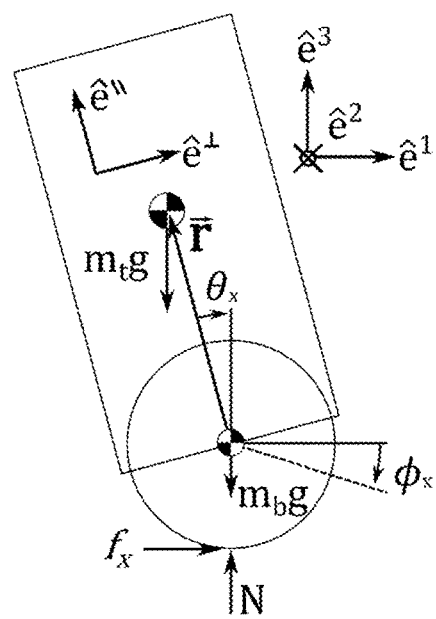
FIG. 7 illustrates generalized coordinates of an embodiment of a MBBR.

The omniwheels are orthogonal to each other if the vectors $\hat{w}^1$, $\hat{w}^2$, $\hat{w}^3$ are mutually orthogonal. This may be achieved by calculating the $\hat{w}^i$ given the $\alpha$ and $\beta$, then checking if $\hat{w}^i \cdot \hat{w}^j = 0$ for $i \neq j$ and $i, j \in \{1, 2, 3\}$. The $\hat{w}^i$ can be determined using the following equations:

$$\hat{w}^i = \text{Rot}(\hat{z}_1^i, \beta) \text{Rot}(\hat{y}_0^i, \alpha) \hat{x}_0^i, \quad (7)$$

$$\hat{z}_1^i = \text{Rot}(\hat{y}_0^i, \alpha) \hat{z}_0^i, \quad (8)$$

$$\hat{w}^i = \text{Rot}(\hat{e}^3, 2\pi/3)^{i-1} \hat{w}^1, \quad (9)$$

where $\text{Rot}(\hat{x}, \alpha)$ is the Euler rotation matrix about $\hat{x}$, and $\{\hat{x}_0^i, \hat{y}_0^i, \hat{z}_0^i\}$ are the initial wheel axis coordinates, which are set up as shown in FIG. 7. In particular, our prototype is set up such that the initial coordinates for the first wheel are the same as lab coordinates $\{\hat{e}^1, \hat{e}^2, \hat{e}^3\}$. Given a particular value for $\alpha$, we can determine the $\beta$ which gives us $\hat{w}^i \cdot \hat{w}^j = 0$ for $i \neq j$ using an iterative method. Examples of $\{\alpha, \beta\}$ pairs resulting in orthogonal omniwheel orientation are provided in Table 2 below. (Note that a few of the $\{\alpha, \beta\}$ pairs provided in Table 1 are repeated in Table 2.)

TABLE 2

| | α | | | |
|---|---|---|---|---|
| | 45° | 60° | 70° | 80° |
| β | 35.237° | 48.186° | 52.082° | 54.145° |

The case of $\alpha = 70°$, $\beta = 52.082°$ gives a transformation matrix $T_w$ of:

$$T_w = \begin{pmatrix} 0.2102 & -0.7883 & 0.5781 \\ 0.7889 & -0.2124 & -0.5765 \\ -0.5775 & -0.5775 & -0.5775 \end{pmatrix} \quad (10)$$

As discussed above, there are multiple benefits of the inventive orthogonal omniwheel orientation. First, the conventional omniwheel orientation at large α angles leads to diminished torque available to translate the ball. Further, the orthogonal omniwheel orientation leads directly to rotation of the ball in the actuated direction; actuation of a single omniwheel does not result in a force applied against the other two omniwheels in a manner that results in the spinning of the rollers of the actuated omniwheel, thereby providing a smoother application of torque.

The MBBR dynamics are inherently 3D, complex, and nonlinear. They can be derived with Lagrangian dynamics using no slip constraints between the ball and the floor ($x = r_b \phi_y$, $y = -r_b \phi_x$) and ideal omniwheel assumptions. In order to apply linear control, we simplify the problem significantly by assuming that the yaw rate (spin) of the MBBR (i.e., around the z axis) is negligible (i.e., $\phi \approx 0$). Next, we linearized the $\theta_x$ and $\theta_y$ about small angles. This simplifies the equations of motion into two linear, decoupled, non-minimum phase Mobile Inverted Pendulum (MIP) problems in the x and y directions. Additional simplifying assumptions include: no slip between the ball and the floor ($x = r_b \phi_y$, $y = -r_b \phi_x$), and ideal omniwheels. We define $\theta$ as the upper-body tilt angle, and $\phi$ as the ball rotation angle in upper-body coordinates (see FIG. 7). Note that the angles in the y-direction affect the linear displacement in the x-direction, and vice-versa.

Using the free body diagram in FIG. 7, we can write the planar equation of motion in the x-direction as $$I_{b_y} \ddot{\phi}_y = \tau_y - r_b f_x,$$

$$I_{t_y} \ddot{\theta}_y = -\tau_y - P_z l \sin\theta_y - P_x l \cos\theta_y,$$

$$m_b \ddot{x} = P_x - f_x,$$

$$m_t [\ddot{r} \cdot \hat{e}^1] = m_t [\ddot{x} - l \cos\theta_y \ddot{\theta}_y + l \sin\theta_y \dot{\theta}_y^2] = -P_x,$$

$$m_t [\ddot{r} \cdot \hat{e}^\perp] = m_t [\cos\theta_y \ddot{x} - l \ddot{\theta}_y],$$
$$= -m_t g \sin\theta_y - P_z \sin\theta_y + P_x \cos\theta_y,$$

where m is the mass, I is the moment of inertia about the center of mass, the subscripts b and t represents the "ball" and "top body", respectively, $r_b$ is the ball radius, l is the distance from the top body center of mass to the ball center, g is the acceleration of gravity, x is the linear displacement of the ball, $P_x$ and $P_z$ are the normal forces, $f_x$ is the friction between the ball and the floor, and $\tau_y$ is the net effective motor torque. Combining, applying the no slip condition, and linearizing using the small angle approximation on $\theta_y$ leads to the following linear system:

$$[I_{b_y} + (m_t + m_b) r_b^2] \ddot{\phi}_y + m_t r_b l \ddot{\theta}_y = \tau_y, \quad (11)$$

$$m_t r_b l \ddot{\phi}_y + I'_{t_y} \ddot{\theta}_y - m_t g l \theta_y = -\tau_y, \quad (12)$$

where $I'_{t_y}$ is the inertia of the top body at the ball's center of mass. The motor dynamics are augmented to the equations of motion above, resulting in a model that may be used to design the controller. The torque produced by the motors in this direction can be expressed using the linear motor model:

$$\tau_y = (k V_{max}/R_m) u_y - (b + k^2/R_m)(\dot{\phi}_y - \dot{\theta}_y), \quad (13)$$

where k is the motor constant, $V_{max}$ is the maximum battery voltage, $R_m$ is the motor internal resistance, b is the motor Coulomb friction, and $u_y$ is the effective motor duty cycle. The x-direction has similar dynamics, with a different inertia, ball rotation speed, and input directions.

Figure 8:
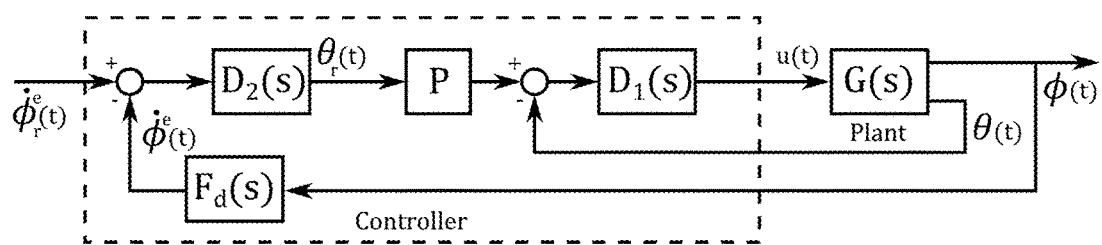
FIG. 8 is a block diagram of an embodiment of a SLC controller.

Successive Loop Closure (SLC), which is well known in the fields of autonomous vehicle control and robotics, was used to separate the SIMO (single-input, multiple output) dynamics of each MIP (mobile inverted pendulum) problem into two SISO (single-input, single-output) parts. The (fast) inner loop stabilizes the upper body angle θ to some reference $\theta_r$. The (slow) outer loop adjusts $\theta_r$ to stabilize the ball rotation angle φ about some reference value, which can be changed via remote control. This strategy works due to frequency separation (of at least a factor of 3) between the crossover frequencies of the inner and outer loops. A block diagram representation of the controller formulation is shown in FIG. 8. Briefly, the SIMO plant G(s) can be idealized as a cascade of two SISO transfer functions, $G_1(s)$ and $G_2(s)$, as follows:

$$G_1(s) = \frac{\Theta_y(s)}{U_y(s)} = \frac{c_1 s}{a_3 s^3 + a_2 s^2 + a_1 s + a_0}, \quad (14)$$

$$G_2(s) = \frac{\Phi_y(s)}{\Theta_y(s)} = \frac{(b_2 s^2 + b_0)}{s^2}, \text{ where} \quad (15)$$

$c_1 = -(kV_{max}/R_m)(I_{b_y} + (m_t + m_b)r_b^2 + m_t r_b l),$ $a_3 = I'_{t_y}[I_{b_y} + (m_t + m_b)r_b^2] - (m_t r_b l)^2,$ $a_2 = (b + k^2/R_m)(I_{b_y} + (m_t + m_b)r_b^2 + 2m_t r_b l + I'_{t_y}),$ $a_1 = -(I_{b_y} + (m_t + m_b)r_b^2)(m_t g l),$ $a_0 = -(b + k^2/R_m)m_t g l,$ $b_2 = -(m_t r_b l + I'_{t_y})/(I_{b_y} + (m_t + m_b)r_b^2 + m_t r_b l),$ $b_0 = m_t g l/(I_{b_y} + (m_t + m_b)r_b^2 + m_t r_b l).$ We use a "dirty differentiator" filter $F_d(s)$ to estimate the value of $\dot{\phi}$ to be used in the velocity controller as follows:

$$\dot{\Phi}_y^e(s) = \frac{s}{s + \omega_c}\Phi_y(s) = F_d(s)\Phi_y(s), \quad (16)$$

where $\omega_c$ is the cutoff frequency of the filter. The inner loop controller $D_1(s)$ takes the difference between the reference body angle $\theta_r$ and the current angle θ as an input and outputs the motor command value u. The outer loop controller $D_2(s)$ takes the difference between the reference ball angular velocity $\dot{\phi}_r^e$ and the current speed $\dot{\phi}$ and outputs the reference body angle $\theta_r$. Each controller $D_1(s)$ and $D_2(s)$ are designed independently, where the prescaler P value is set to counteract the steady state error of the inner loop. Using the measured parameters and $\omega_c = 40$ rad/s, the system transfer functions are:

$$G_1(s) = \frac{17.9s}{(s - 13.33)(s + 13.45)(s + 0.06)}, \quad (17)$$

$$G_2(s) = \frac{-3.48(s + 8.63)(s - 8.63)}{s^2}, \quad (18)$$

$$F_d(s) = \frac{s}{s + 40}. \quad (19)$$

The transfer functions are the same for both x- and y-directions as long as their respective inertia are the same.

The following controller was used for both directions:

$$D_1(s) = 50\frac{(s + 13.45)(s + 0.06)}{s(s + 40.34)} \quad (20)$$

$$D_2(s) = 4P\frac{1}{(s + 8.63)} \quad (21)$$

$$P = 1/2.5 \quad (22)$$

These controllers have a closed loop step response with inner and outer loop rise time $t_r$ of 0.11 sec and 0.38 sec respectively. The inner loop has 5% overshoot while the outer loop has no overshoot. Based on the assumption that the heading $\varphi_z$ is approximately constant, the headings can be controlled using the simple PD controller $$u_z = K_p(\phi_{z_{ref}} - \phi_z) + K_d(\dot{\phi}_{z_{ref}} - \dot{\phi}_z). \quad (23)$$

After determining $u_x$, $u_y$, and $u_z$, we convert these values back into each individual motor PWM commands $u_i$, i={1, 2, 3}, using the same transformation for τ Equation (5) because of the linear relationship between τ and u. Then we calculate $$\begin{pmatrix} u_1 \\ u_2 \\ u_3 \end{pmatrix} = \frac{r_w}{r_b} T_w^{-1} \begin{pmatrix} u_x \\ u_y \\ u_z \end{pmatrix}. \quad (24)$$

After the conversion, the static friction on the omniwheels must also be taken into account. Using mid-latitude omniwheel placement introduces more normal force into the system, increasing friction. Using the nonlinear input value given by $$u'_i = c\,\text{sign}(u_i) + (1 - c)u_i, \quad (25)$$

where c is the static boast constant and $u'_i \in [-1, 1]$ is the final motor command value for the motor i.

EXAMPLE 1

Prototype DROW-driven MBBR

Figure 9:
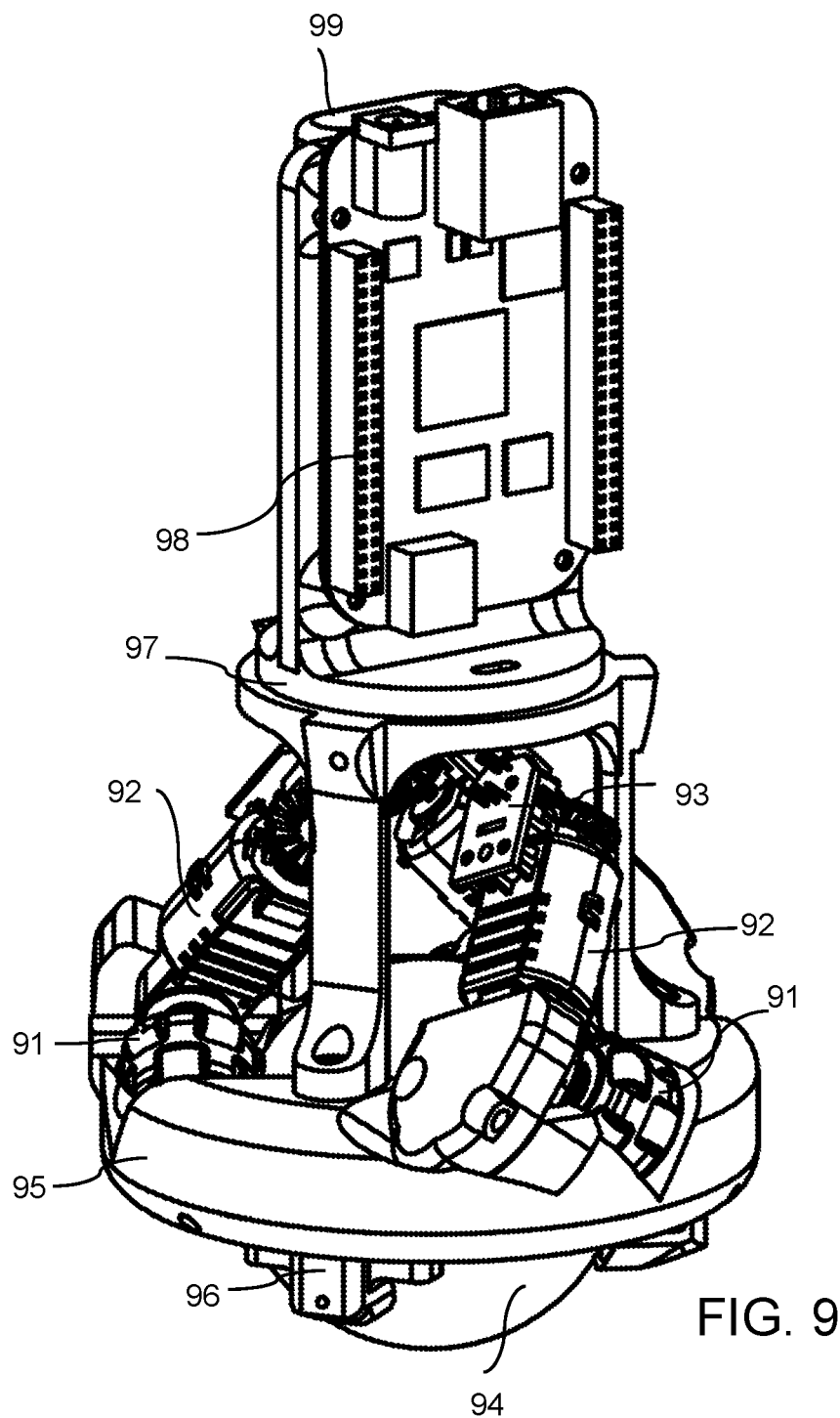
FIG. 9 is a perspective view of an MBBR according to an embodiment of the invention.

Multiple prototypes with similar mechanical architectures and hardware were constructed. The most robust configuration was a DROW driven MBBR with wheels placed at α=70°. FIG. 9 illustrates the basic components of this embodiment, which includes DROW 91, gearmotor 92, optical encoder 93, ball 94, chassis 95, a support ball bearing housing 96, frame/electronics mount 97, control electronics/microprocessor 98, and battery pack 99. Additional details of the prototype as constructed are provided in Table 3 below:

TABLE 3

| Component | Details |
| --- | --- |
| DROW (91) | 2.5 cm |
| Gearmotor (92) | Toy-grade plastic |
| Ball (94) | Rubber, 6.4 cm diameter |
| Chassis (95) | 3D printed |
| Ball Bearing Housing (96) | Acetal ball |
| Frame/Electronics mount (97) | 3D printed |
| Control Electronics/Microprocessor (98) | BeagleBone Black microprocessor (BeagleBoard.org) |
| Battery pack (99) | Lithium-ion (Panasonic 18650) |

One of the most difficult components to source was the main ball 94. It was found that the ball must be sufficiently round and have a high coefficient of friction. Most balls smaller than 7 cm in diameter had surface imperfections and lacked the roundness to work properly. Also, balls that had a high coefficient of friction tended to be too compliant, causing the ball to deform under large dynamic loads. We found that a high quality rubber juggling ball was the best compromise between hardness, roundness, and surface friction. The omniwheels were placed in contact with the ball in the orthogonal configuration with $\alpha=70°$ and $\beta=52.082°$. The motors 92 and omniwheels 91 were rigidly mounted to a 3D printed toroidal chassis 95. The torus was designed to remain rigid under the larger normal forces associated with large $\alpha$ angles. Low friction acetal support balls in ball bearing housing 96 were used to constrain the ball 94 against the omniwheels 91 under dynamic maneuvers. The support ball bearing housing 96 was designed to be adjustable, to allow varying of the preload of the support ball against the ball. Finally, 3D printed frame 97 was used to mount the battery 99 and electronics 98, with the legs of the frame 97 attaching to the top of chassis 95 by screws or other fasteners.

Figure 10:
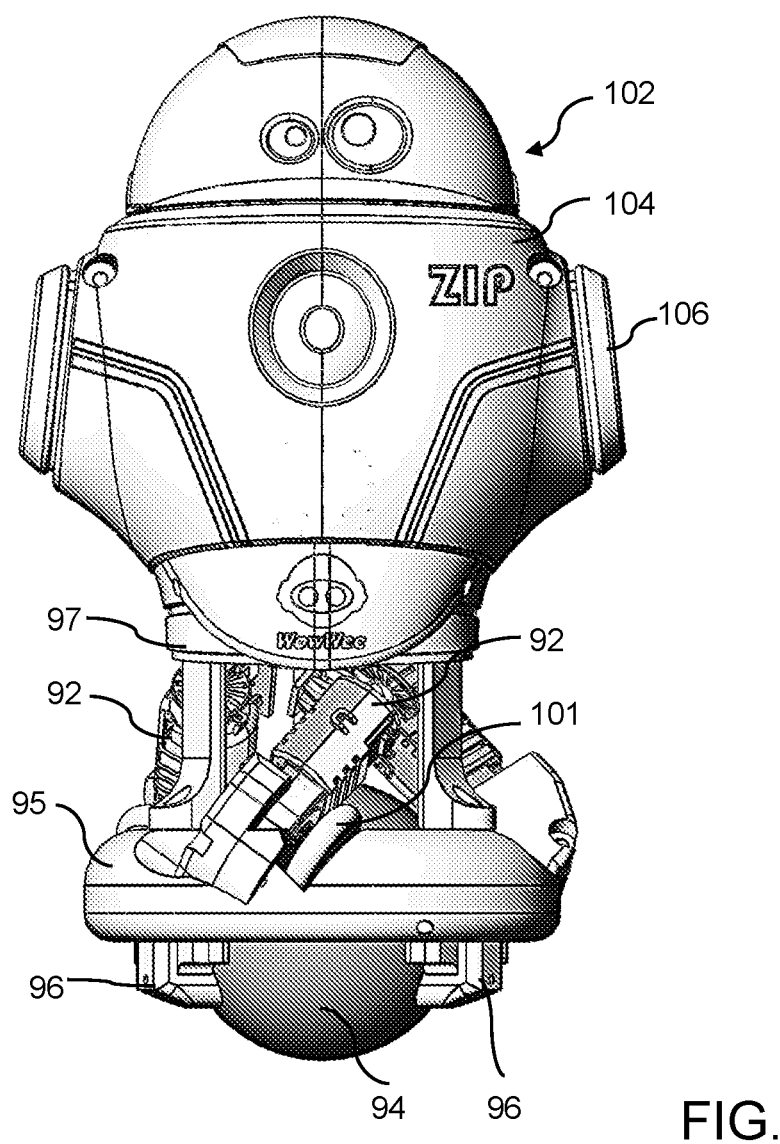
FIG. 10 is a front view of an exemplary toy robot based on embodiment of the invention.

FIG. 10 illustrates an example of a toy MBBR 102 in which an outer molded skin 104 closely fits over a structure similar to that shown in FIG. 9. The chassis 95, lower portion of frame 97, ball 94, support ball bearing housing 96, and gear motors 92 can be clearly seen at the lower part of the MBBR 102. In this embodiment, the omniwheel 101 is shown as a single wheel for simplicity. It will be readily apparent that a SROW or DROW wheel structure may also be used. In a commercial embodiment, arms (not shown) may be attached at shoulders 106 to give a more anthropomorphic appearance. In some embodiments, additional control elements may be included in the electronics to provide control commands to, and feedback from, motors within the MBBR body, the arms, or a combination thereof, to allow for independent and/or coordinated movement of the robot's arms.

EXAMPLE 2

Experimental Results

After many design iterations, several trends were observed: as expected, SROWs resulted in lower friction and better overall performance due to their roundness and single contact plane. However, there were issues with SROW durability which were believed to be intrinsic to the SROW design at small scales. Also, by increasing the $\alpha$ angle, we were able to stabilize designs that were not viable due to ball contact issues. For example, the experimental DROW MBBR designs only worked if $\alpha$ was increased from 45° to 70°. However, increasing $\alpha$ to 80° significantly increased friction and could jam the ball into the socket due to the combination of widely spaced contact points and ball compliance.

In addition, some designs were found to be more reliant on the support balls in the ball bearing housing to constrain the ball. For example, with the support balls removed, we found the SROW $\alpha=70°$ design was able to balance, but the SROW $\alpha=45°$ could not. In practice, all designs benefited from the use of supporting balls, however, experiments demonstrated that larger $\alpha$ angles are better able to constrain the ball.

Figure 11A:
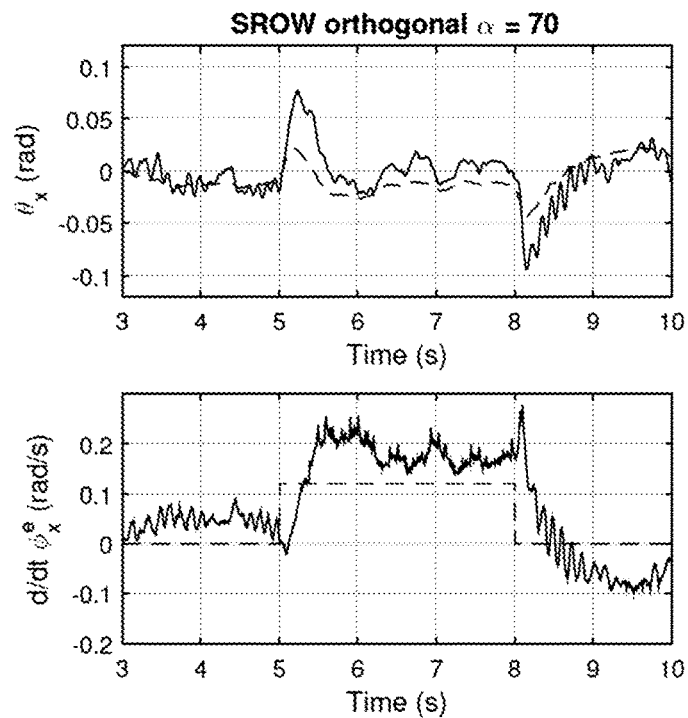
FIGS. 11A-11C are plots of the upper body tilt angle (upper) and variation in ball rotation angle (lower) for single row orthogonal omniwheel angle α=70°, double row orthogonal omniwheel angle α=70°, and single row conventional omniwheel angle α=45°, respectively.
Figure 11B:
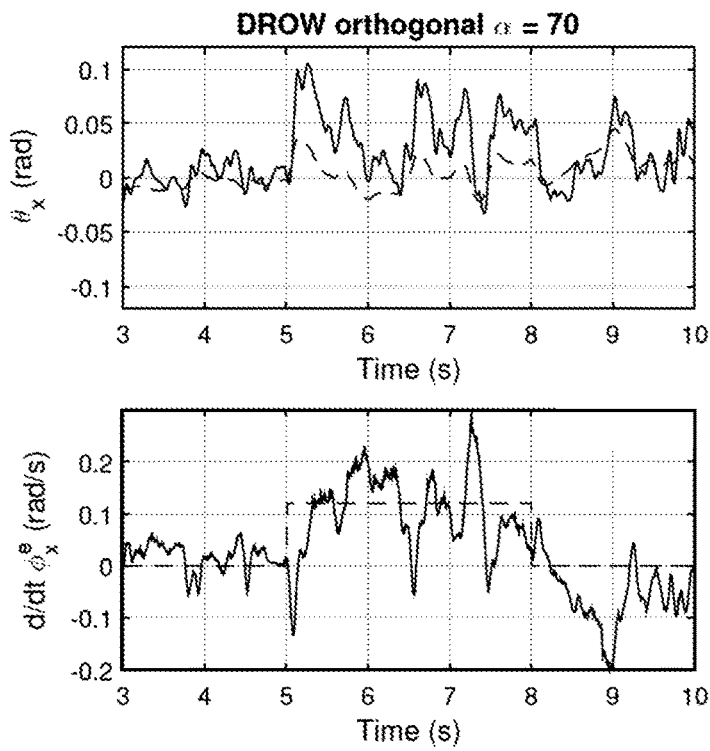
Figure 11C:
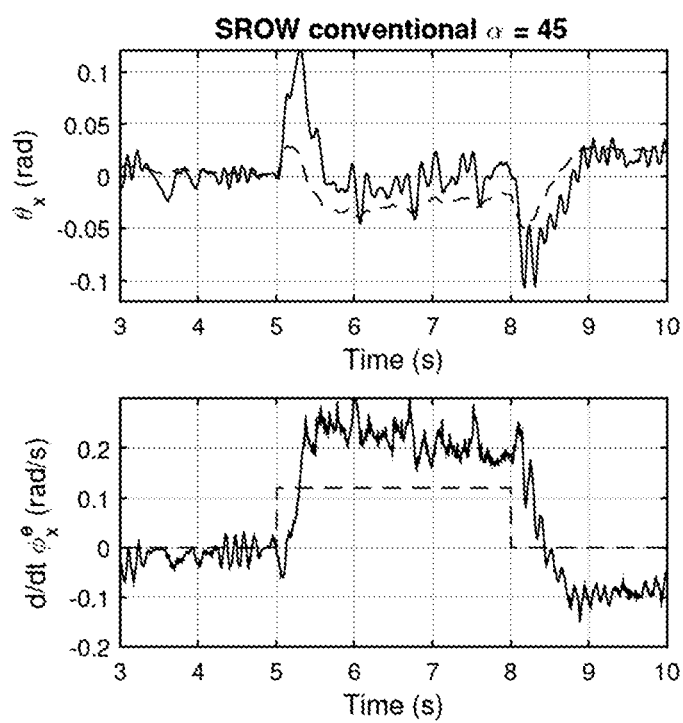

Data were generated for three successful MBBR designs: orthogonal SROW with $\alpha=70°$, orthogonal DROW with $\alpha=70°$, and conventional SROW with $\alpha=45°$. Data was logged from these three prototypes during a 3 second velocity input of 1.2 rad/s which commands the robot to move forward then to come to a full stop. The results are shown in FIGS. 11A-11C, where the solid line corresponds to the measurement and the dashed line indicates the reference. All three MBBR designs responded and tracked the velocity step well while the actual angle $\theta$ closely matches the controller's inner loop reference $\theta_r$. This allows the MBBRs to be smoothly driven using remote control.

Looking at the $\theta$ values of the DROW MBBR (upper plot of FIG. 11B), it is seen to suffer from a~8 Hz wobble caused by the reasons described above. In addition, the $\dot{\phi}$ (lower plot of FIG. 11B) shows that the prototype struggles to follow the velocity step response. This is because the inner loop, which has priority over the outer loop, attempts to stabilize the wobble prior to following the velocity command. Also, the controller gains for the DROW MBBR needed to be increased relative to the SROW MBBR in order to achieve similar performance. Without wishing to be bound by theory, we believe this is caused by the switching of actuation planes, which requires additional control to counteract the perturbations. The squared sum of the control values at time step k, $u_k$ for t=3-10 sec can be calculated to compare the control effort $J_u$ of both designs. The $J_u$ for the SROW and DROW MBBRs are 430 and 1050 respectively, which means that the SROW MBBR can be driven much more efficiently than the DROW MBBR. Comparing the SROW build with $\alpha=45°$ and $\beta=0°$ to the SROW build with $\alpha=70°$ and orthogonal omniwheels, we saw a relatively small difference in performance.

Based on the above-described results, it appears that the SROW MBBR exhibits less slip against the ball and has smoother actuation compared to the DROW MBBR. However, at the "micro" scales needed for MBBRs, the SROW configuration tends to be more fragile, and might be cost prohibitive in some applications. Also, increasing the $\alpha$ angle can counteract the low mass of MBBRs by increasing the normal force to eliminate omniwheel slip and reduce ball ejection. However, increasing the $\alpha$ must be balanced against increased friction and stress on the omniwheels. The orthogonal orientation is essential when larger $\alpha$ angles are employed in order to maintain sufficient torque to balance the vehicle. It will be readily apparent to those in the art that, while the examples and discussion provided herein have been primarily focused on micro ball-balancing robots (MBBRs), the inventive configurations can also be applied to high-performance large-scale BBRs.

While the foregoing written description contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A ball-balancing drive assembly, comprising:
a ball having a ball surface and a reference axis extending through a centroid of the ball;
three omniwheel assemblies, each omniwheel assembly comprising a motor having a motor axle and an omniwheel configured to rotate around the motor axle;
a chassis configured for supporting the three omniwheel assemblies at radially symmetric spacings with the motor axles oriented at an angle relative to the reference axis and the omniwheels oriented in mutually-orthogonal planes, wherein each omniwheel frictionally contacts the ball surface to convert rotational motion of the motor axle to torque on the ball.

2. The ball-balancing drive assembly of claim 1, wherein the ball surface has an equator corresponding to a plane perpendicular to the reference axis that bisects the ball, wherein the omniwheels frictionally contact the ball surface within a mid-latitude range near the equator.

3. The ball-balancing drive assembly of claim 2, wherein the mid-latitude range comprises 20° N to 30° N of the equator.

4. The ball-balancing drive assembly of claim 1, wherein angle relative to the reference axis is within a range of 45° to 80°.

5. The ball-balancing drive assembly of claim 1, wherein the angle relative to the reference axis is within a range of 60° to 70°.

6. The ball-balancing drive assembly of claim 1, wherein the omniwheels are oriented mutually-orthogonally within a range of 35° to 55°.

7. The ball-balancing drive assembly of claim 1, wherein the omniwheels are oriented mutually-orthogonally within a range of 48° to 52°.

8. The ball-balancing drive assembly of claim 1, wherein the omniwheels are single row omniwheels.

9. The ball-balancing drive assembly of claim 1, wherein the omniwheels are double row omniwheels.

10. The ball-balancing drive assembly of claim 1, further comprising a frame extending from the chassis, the frame configured for supporting a power supply.

11. The ball-balancing drive assembly of claim 1, further comprising a controller for selectively and independently activating each omniwheel assembly.

12. A ball-balancing robot, comprising:
a ball having a ball surface and a reference axis extending through a centroid of the ball;
three omniwheel assemblies, each omniwheel assembly comprising a motor having a motor axle and an omniwheel configured to rotate around the motor axle;
a chassis configured for supporting the three omniwheel assemblies at 120° spacings with the motor axles oriented at an angle $\alpha$ relative to the reference axis and the omniwheels rotated at an angle $\beta$ to define mutually-orthogonal planes, wherein each omniwheel frictionally contacts the ball surface to convert rotational motion of the motor axle to torque on the ball;
a frame extending upward from the chassis;
a control assembly disposed on the frame, the control assembly comprising an electronic controller for selectively and independently activating the omniwheel assemblies; and
a power supply for powering the motors and the control assembly.

13. The ball-balancing robot of claim 12, wherein the ball surface has an equator corresponding to a plane perpendicular to the reference axis that bisects the ball, wherein the omniwheels frictionally contact the ball surface within a mid-latitude range near the equator.

14. The ball-balancing robot of claim 13, wherein the mid-latitude range comprises 20° N to 30° N of the equator.

15. The ball-balancing robot of claim 12, wherein angle $\alpha$ is within a range of 45° to 80°.

16. The ball-balancing robot of claim 12, wherein the angle $\beta$ is within a range of 35° to 55°.

17. The ball-balancing robot of claim 12, wherein the angle $\alpha$ and the angle $\beta$ are selected as an angle pair from the pairs consisting of

|   | $\alpha$ | | | |
| --- | --- | --- | --- | --- |
|   | 45° | 60° | 70° | 80° |
| $\beta$ | 35.237° | 48.186° | 52.082° | 54.145° |

18. The ball-balancing robot of claim 12, wherein the omniwheels are single row omniwheels.

19. The ball-balancing robot of claim 12, wherein the omniwheels are double row omniwheels.

20. The ball-balancing robot of claim 12, further comprising an outer skin configured for enclosing at least of portion of the frame, control assembly and power supply.

* * * * *